US010505429B2

(12) United States Patent
Slaughter et al.

(10) Patent No.: US 10,505,429 B2
(45) Date of Patent: Dec. 10, 2019

(54) ELECTRICAL GENERATOR CONNECTION APPARATUS

(71) Applicant: Caterpillar Inc., Peoria, IL (US)

(72) Inventors: Nelson H. Slaughter, Locust Grove, GA (US); John H. Hancock, Peachtree City, GA (US)

(73) Assignee: Caterpillar Inc., Peoria, IL (US)

( * ) Notice: Subject to any disclaimer, the term of this patent is extended or adjusted under 35 U.S.C. 154(b) by 543 days.

(21) Appl. No.: 15/380,665

(22) Filed: Dec. 15, 2016

(65) Prior Publication Data

US 2018/0174778 A1 Jun. 21, 2018

(51) Int. Cl.
| | |
|---|---|
| *H01H 9/00* | (2006.01) |
| *H02K 11/20* | (2016.01) |
| *H02K 5/22* | (2006.01) |
| *H02K 11/30* | (2016.01) |
| *H01R 12/70* | (2011.01) |
| *H01R 29/00* | (2006.01) |

(52) U.S. Cl.
CPC ........... *H02K 11/20* (2016.01); *H01H 9/0011* (2013.01); *H02K 5/225* (2013.01); *H02K 11/30* (2016.01); *H01R 12/7094* (2013.01); *H01R 29/00* (2013.01)

(58) Field of Classification Search
CPC . H01R 29/00; H01R 12/7094; Y10S 439/956; H01H 9/0011
See application file for complete search history.

(56) References Cited

U.S. PATENT DOCUMENTS

| | | | |
|---|---|---|---|
| 2,552,028 A | 5/1951 | Blair | |
| 2,794,081 A * | 5/1957 | Luhn | H01H 19/585 |
| | | | 200/14 |
| 2,874,317 A | 2/1959 | Couse | |
| 4,937,482 A | 6/1990 | Dohogne | |
| 5,293,091 A | 3/1994 | Edwards et al. | |
| 5,682,090 A | 10/1997 | Adachi et al. | |
| 8,106,318 B2 * | 1/2012 | Bilder | H01R 13/6658 |
| | | | 200/293 |
| 2003/0181070 A1 | 9/2003 | Topp et al. | |

FOREIGN PATENT DOCUMENTS

| | | |
|---|---|---|
| CN | 201528242 U | 7/2010 |
| CN | 101814667 A | 8/2010 |
| DE | 202013105893 U1 | 3/2014 |
| GB | 804552 A | 11/1958 |

* cited by examiner

*Primary Examiner* — Tho D Ta
(74) *Attorney, Agent, or Firm* — Leydig, Voit & Mayer, Ltd.

(57) ABSTRACT

A connection apparatus includes a fixed board assembly and a selector board assembly. The fixed board assembly including a fixed board including a center axis and a plurality of contact pairs attached to the fixed board, each of a generator winding in electrical continuity with at least one of the plurality of contact pairs. The selector board assembly is rotatably mounted on the fixed board assembly and includes a selector board and a plurality of jumpers attached to the selector board. The plurality of jumpers are shaped and arranged on the selector board to electrically bridge at least one of the contact pairs to provide a first voltage output in a first configuration and a second voltage output in a second configuration. The second configuration is produced by rotating the selector board assembly relative to the fixed board assembly about the center axis from the first configuration.

20 Claims, 7 Drawing Sheets

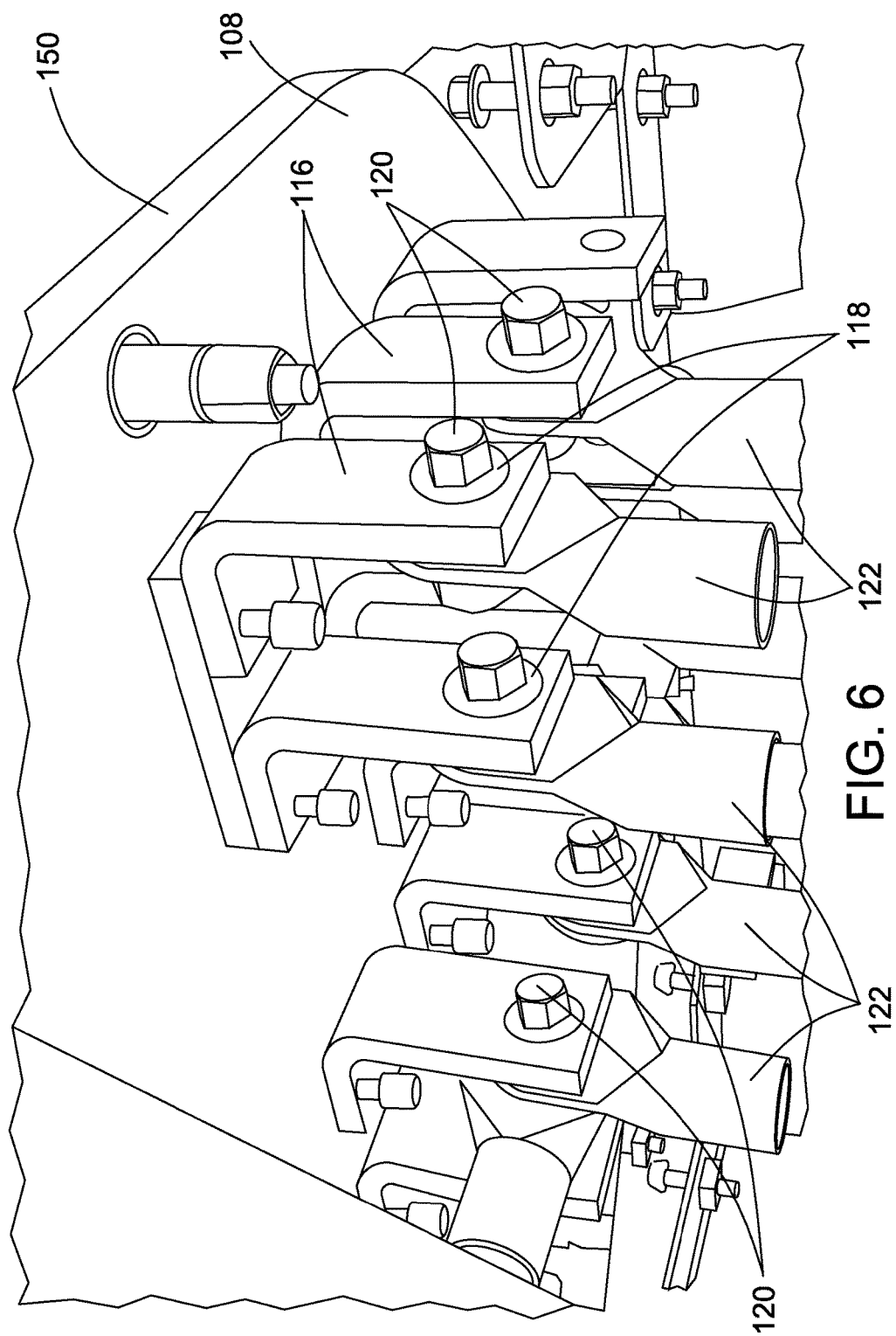

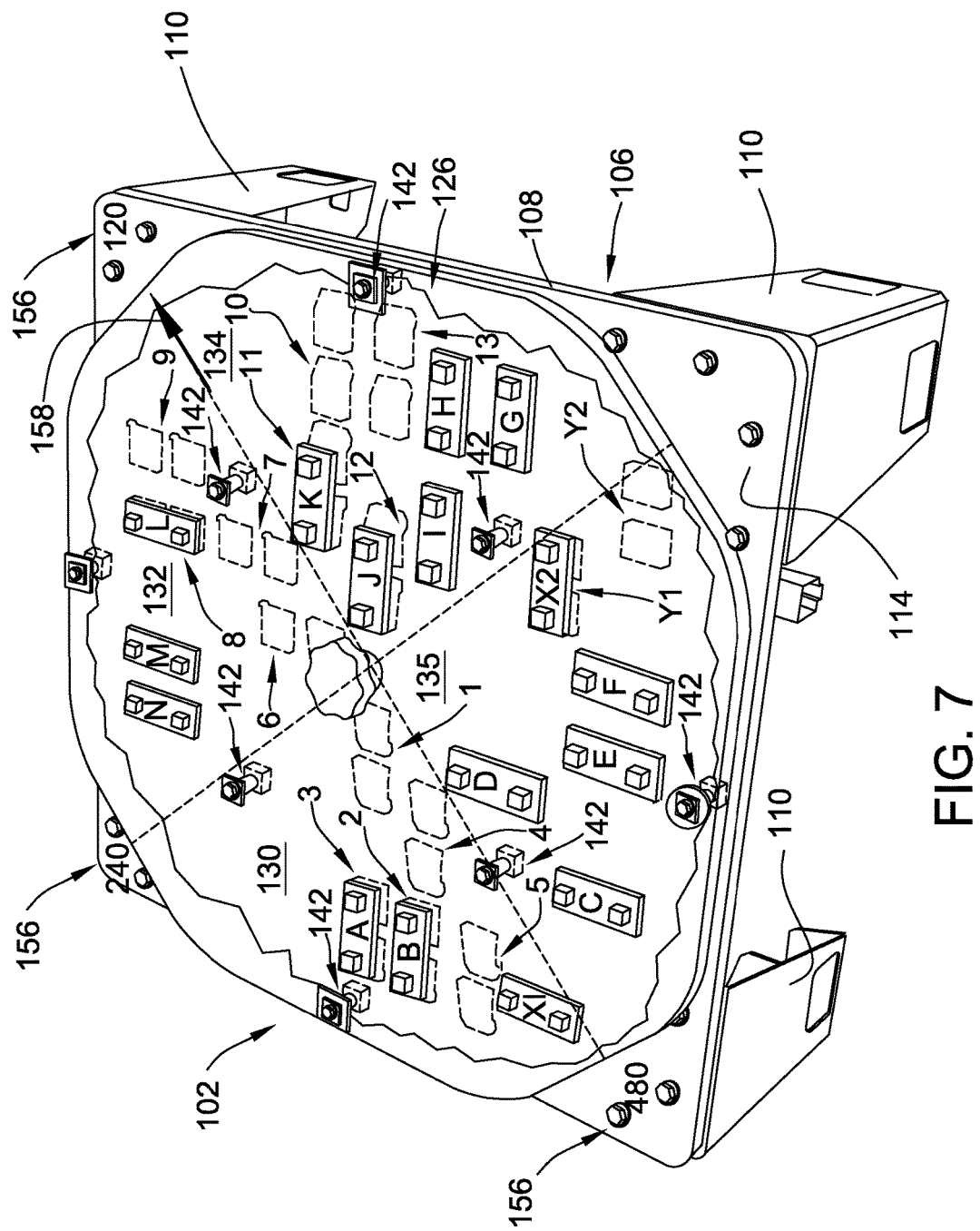

ELECTRICAL GENERATOR CONNECTION APPARATUS

TECHNICAL FIELD

The present disclosure relates to a connection apparatus that functions as a switch, and in particular, to a connection apparatus that is operable to selectively reconfigure the electrical output of a generator.

BACKGROUND

Three phase generators, in mobile equipment, are capable of generating a plurality of voltages in accordance with the application. The different voltages are generated by changing how a set of generator windings are connected according to well known configurations. Existing devices for interconnecting a plurality of generator windings to generate selected voltages include complicated bus arrangements and manual connection of heavy wires to the bus arrangement in different combinations. Other devices require wholesale replacement of parts of a switch mechanism and installation in the correct orientation. This requires highly skilled workers and can be dangerous if improper connections are made. Other devices include elaborate and expensive switches.

SUMMARY OF THE DISCLOSURE

One aspect of the present disclosure connection is an apparatus that includes a fixed board assembly and a selector board assembly. The fixed board assembly including a fixed board including a center axis and a plurality of contact pairs attached to the fixed board, each of the windings in electrical continuity with at least one of the plurality of contact pairs. The selector board assembly is rotatably mounted on the fixed board assembly and includes a selector board and a plurality of jumpers attached to the selector board. The plurality of jumpers are shaped and arranged on the selector board to electrically bridge at least one of the contact pairs to provide a first voltage output in a first configuration and a second voltage output in a second configuration. The second configuration is produced by rotating the selector board assembly relative to the fixed board assembly about the center axis from the first configuration.

Another aspect of the disclosure is a method of selecting an output voltage of a three phase generator with a connection apparatus, the connection apparatus including a fixed board assembly and a selector board assembly, the fixed board assembly operatively connected to the generator, the fixed board assembly including a fixed board including a center axis and a plurality of contact pairs attached to the fixed board, each of a plurality of windings of an electrical generator is in electrical continuity with at least one of the plurality of contact pairs, the selector board assembly rotatably mounted on the fixed board assembly, the selector board assembly including a selector board and a plurality of jumpers attached to the selector board, the method including rotating the selector board assembly from a first angular position to a second angular position relative to the fixed board assembly. With a subset of the plurality of jumpers a subset of the plurality of contact pairs are bridged to create a selected configuration corresponding to a selected output voltage. The selector board is secured to the fixed board in the selected position.

Further and alternative aspects and features of the disclosed principles will be appreciated from the following detailed description and the accompanying drawings. As will be appreciated, the principles related to switches disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 6 is a close up view of electrical lugs connected to contacts of the connection apparatus.

FIG. 7 is a top perspective view of the connection apparatus of FIG. 2 with parts in phantom to show the arrangement of internal elements.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
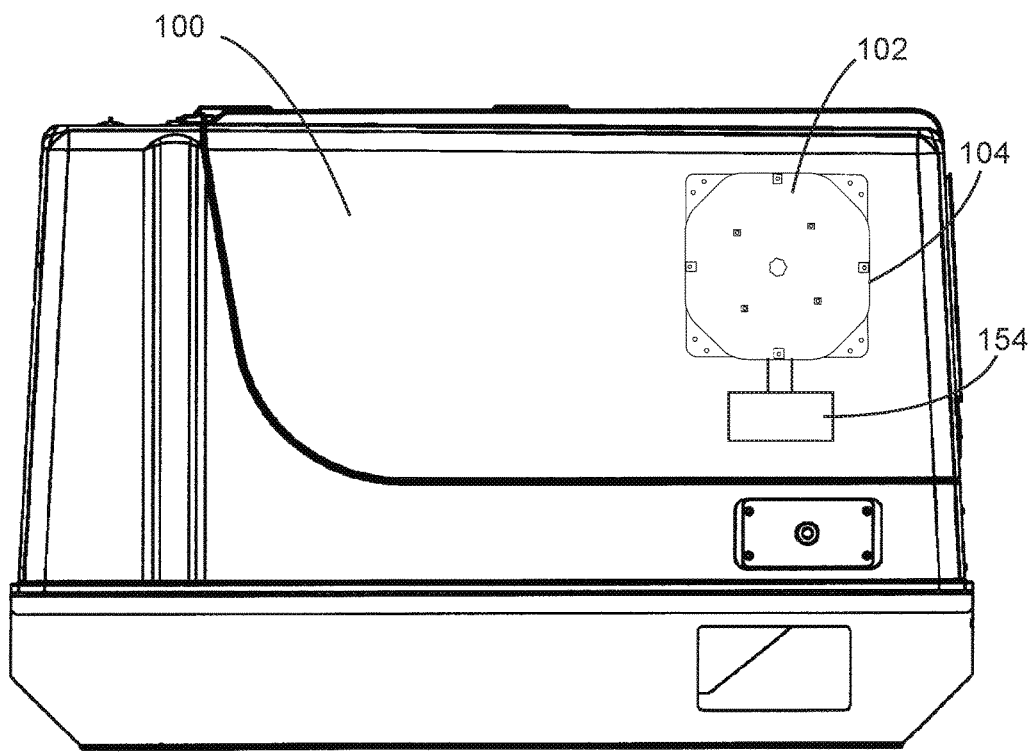
FIG. 1 is a front view of an electrical generator incorporating a connection apparatus according to an embodiment of the disclosure.
Figure 2:
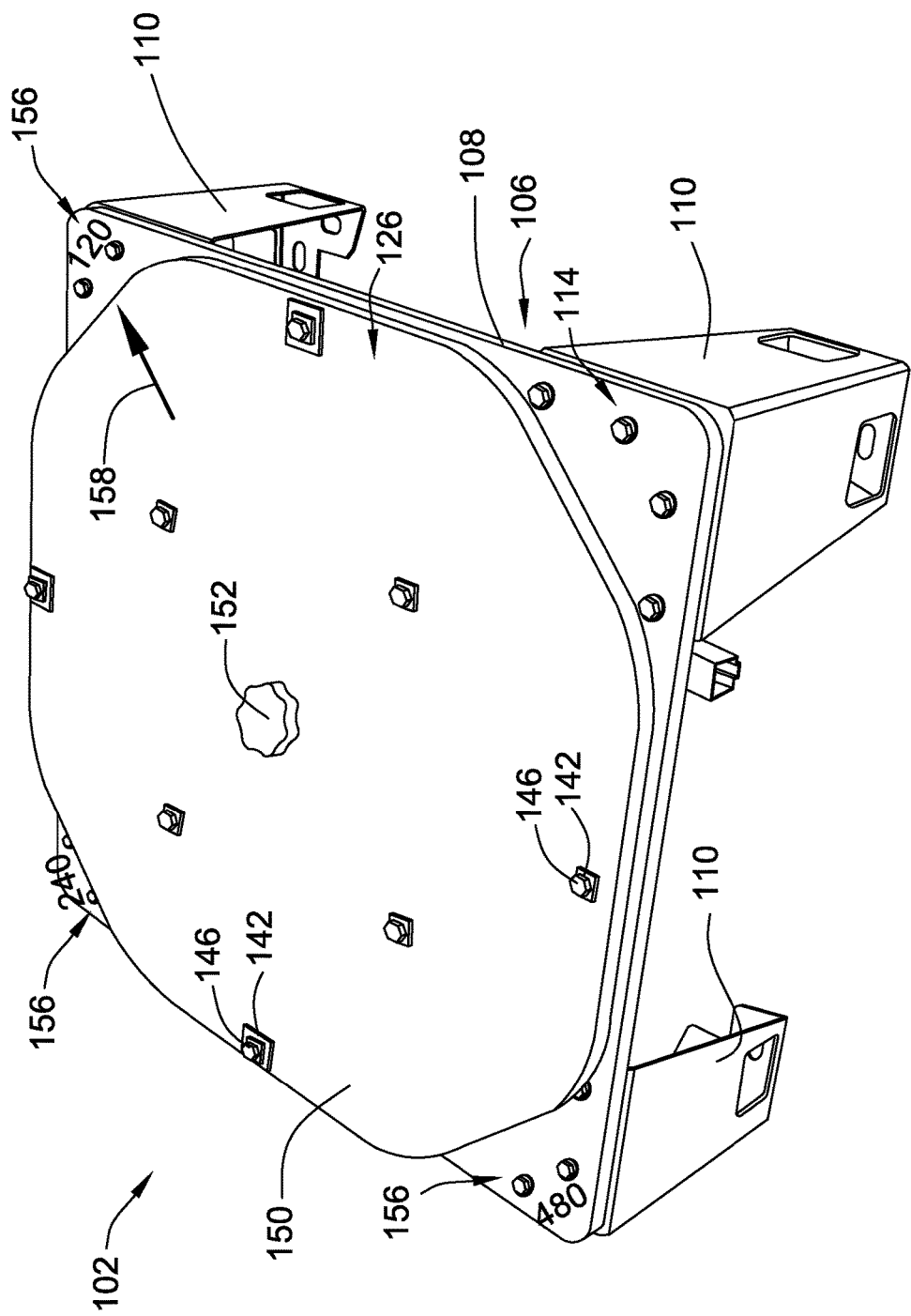
FIG. 2 is a perspective view of a connection apparatus according to an embodiment of the disclosure.
Figure 3:
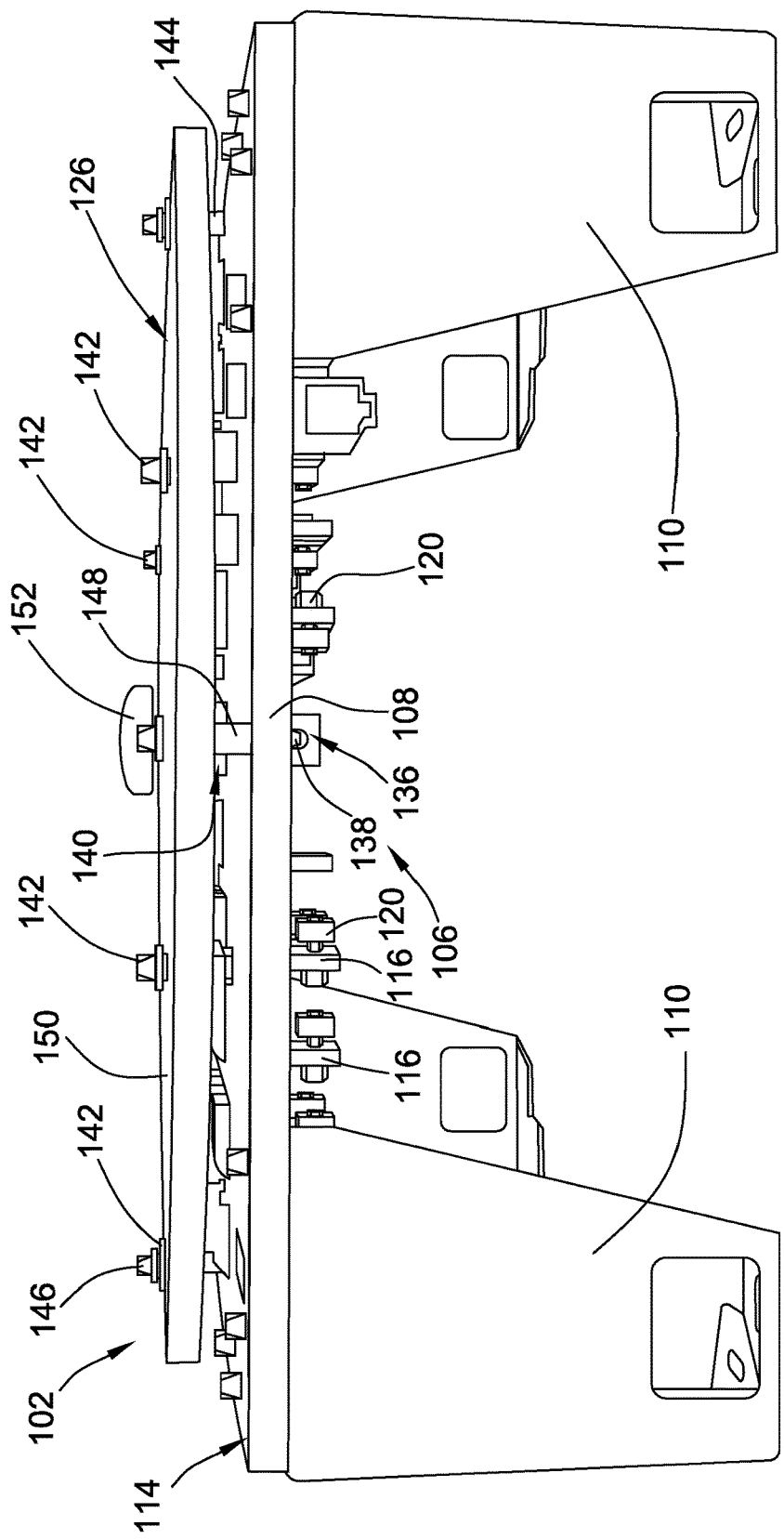
FIG. 3 is a side view of the connection apparatus of FIG. 2.

FIG. 1 illustrates generally a generator 100 with a connection apparatus 102 according to one embodiment of the present disclosure. The generator 100 may be a mobile version or may be permanently installed at a site as is well known. The generator 100 includes a conventional three phase generator with a plurality of generator windings (not shown) which are combinable in different configurations to produce several different electrical outputs. For example, the generator 100 may include six internal windings, which may be combined in three or more various well known configurations, for example series star, parallel star, and single phase (zig zag). Each of the configurations causes a different predetermined electrical output.

The generator 100 includes an apparatus for selecting one of the above configurations of windings. The apparatus is in the form of a connection apparatus 102 with two main assemblies that in combination produce the various winding combinations and a resultant electrical output.

The connection apparatus 102 may be installed in a compartment 104, and covered by a door, or the like, of the generator 100, which isolates the connection apparatus from the effects of weather, contamination and other conditions adverse to the function of the connection apparatus and generator and discourages tampering.

Turning to FIGS. 2-7, the connection apparatus 102 includes two main assemblies. The two main assemblies include a fixed board assembly 106 that is fixedly attached to the generator 100 and a selector board assembly 126 that is rotatably disposed on the fixed board assembly and can be secured in a desired orientation. The fixed board assembly 106 and the selector board assembly 126 interconnect to produce a plurality of configurations based on the orientation of the selector board assembly on the fixed board assembly, each configuration producing a different combination of connections of the windings of the generator and an electrical output of the generator dependent upon the configuration.

The fixed board assembly 106 includes a fixed board 108, a plurality of legs 110 attached at corners, for example, of the fixed board, and a plurality of contact pairs 1-13 (see FIGS. 3-7) attached to the fixed board. The fixed board 108 may have a first indicia 156 on an upper surface 114 to indicate in cooperation with a second indicia 158 on the selector board assembly 126 the output of the generator that results from the selected configuration. The first indicia 156 may include several different spaced apart voltage indicators corresponding to different selectable configurations. The second indicia 158 may include an arrow that aligns with one of the voltage indicators depending on the selected configuration to indicate the configuration being selected by an operator.

The fixed board 108 may be generally rectangular or round and may be made of any suitable non-conductive material, such as GLASTIC, an engineered composite. The material of the fixed board 108 may have electrical insulation properties and high mechanical strength, is lightweight, resistant to corrosion, heat, flame, smoke and toxins and have high abrasion and impact resistance. In one embodiment, the fixed board 108 is about 22 inches square, about one half inch thick and formed with a plurality of openings 112 sized and shaped to receive contact pairs 1-13.

The legs 110 may be of metal or composite construction or any suitable material. The legs 110 connect the fixed board 108 to the generator 100 and provide space between the fixed board 108 and the generator to admit various attaching elements and wiring from the generator windings, for example.

The contact pairs 1-13 may be any suitable size and shape and constructed of electrically conductive material. In one embodiment, the contact pairs include two spaced apart, but adjacent, standard copper bar stock parts, each about 2½ inches long, 1 inch wide by ¼ inch thick. Each of the contact pairs 1-13 may be tin plated copper and are fixed to the fixed board 108 and shaped and sized on an upper surface 114 of the fixed board to be contacted by a cooperating part disposed on the selector board assembly 126.

Each of the contact pairs 1-13 include a terminal part 116 that extends through and below the fixed board into the space between the fixed board and the generator 100. The terminal part 116 is configured to receive and connect to wiring from the generator 100. The terminal part 116 may include a terminal opening 118 sized and shaped to receive a fixture 120, which may be a fastener such as a bolt and nut. The fixture 120 is configured to receive and attach to a wiring lug 122 or any suitable wiring attachment as is well known in the art.

Figure 4:
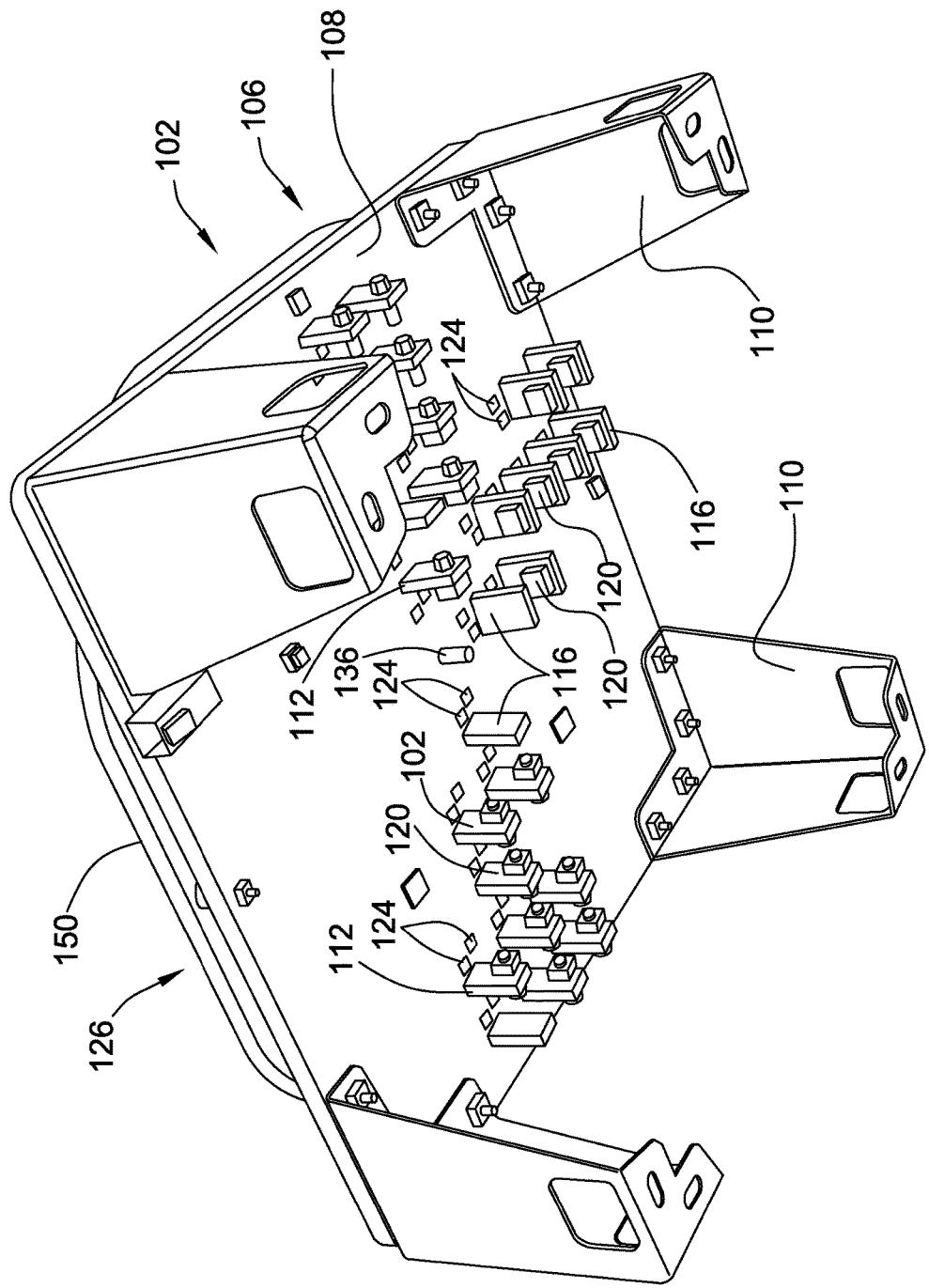
FIG. 4 is a bottom perspective view of the connection apparatus of FIG. 2.
Figure 5:
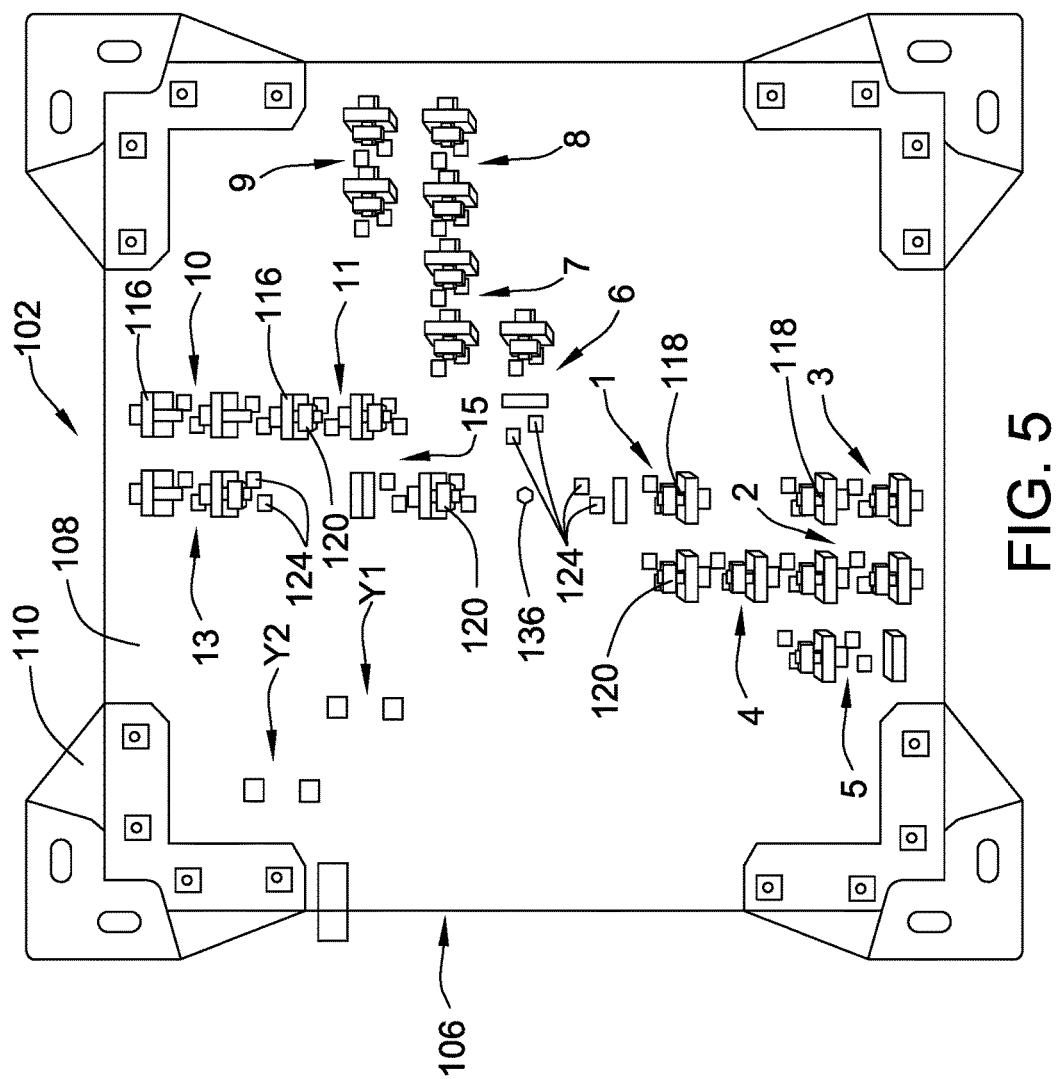
FIG. 5 is a bottom view of the connection apparatus of FIG. 2.

As is shown in FIGS. 4, 5 and 7, the contact pairs 1-13 may be arranged in three groupings. Contact pairs 1-5 occupy a first quadrant 130 of the fixed board 108 and may constitute a first grouping of contact pairs. Contact pairs 6-9 occupy a second quadrant 132 of the fixed board 108 and may constitute a second grouping of contact pairs. Contact pairs 10-13 occupy a third quadrant 134 opposite the first quadrant of the fixed board 108 and constitute a third grouping of contact pairs. A fourth quadrant 135 lacks contact pairs, but in other embodiments may be provided with addition or alternative contact pairs to provide additional voltage output options or other functionality. While there are four potentially available configurations of the fixed board assembly 106 and the selector board assembly 126, each being 90 degrees in rotation, the illustrated embodiment contemplates three different configurations, which will be described in detail below.

The contact pairs 1-13 may be attached to the fixed board 108 with any suitable fastener 124. One example of a suitable fastener 124 is a bolt with a flat T-shaped head.

The fixed board 108 may also include position contact pairs Y1 and Y2. Position contact pairs Y1 and Y2 may provide digital inputs to a generator controller 154 (see FIG. 1). Bridging one, both, or none of position contact pairs Y1 and Y2 provides positional information to the controller 154. One example of such a controller is known as an EMCP controller, such as manufactured by Caterpillar®. The status of Y1 and Y2 detect which position the selector board assembly 126 is in to provide digital inputs to the EMCP controller which automatically activates the proper group of software settings within the EMCP. The EMCP is responsible for basic engine and generator monitoring and protection. With the addition of over/under voltage and over/under frequency protection, the EMCP is designed to provide complete control, monitoring and protection for standby and prime power applications, power metering, protective relaying and engine and generator control and monitoring, paralleling functions, including automatic and manual synchronizing, dead bus arbitration, load sharing, and load sense/load demand. For example, the EMCP detects the status of the contact pairs Y1 and Y2 and dependent upon the voltage generated based on the position of the selector board assembly 126, sets up under and over protection. For example, if the voltage generated exceeds or drops below a specified amount by 5 percent, a warning may be generated. If the voltage generated exceeds or drops below a specified amount by 10 percent, the EMCP may shut down the generator 100.

The fixed board 108 includes a plurality of alignment members 142 arranged thereon. The alignment members 142 may include an elongate alignment element 144, which may be in the form of a rod or bolt fixed in place on the fixed board 108. Each alignment element 144 may be fixed in place with fasteners 146, for example, one or more nuts. Each alignment element 144 may include a spacer or standoff 148 sized and shaped to space apart the fixed board 108 from the selector board assembly 126 a predetermined distance for the contact pairs 1-13 and position contact pairs Y1, Y2 of the fixed board 108 to interact with corresponding elements of the selector board assembly 126. The alignment members 142 connect to the selector board assembly 126 to fix the selector board assembly in a selected one of at least three different possible positions relative to the fixed board assembly 106.

The fixed board 108 includes a center axis 136, which may include a spindle or bolt 138 attached to the fixed board and a spacer or standoff 140 arranged on the bolt. The spacer 140 is located on the upper surface of the fixed board. The spindle 138 and spacer 140 function as a spacer and center pivot for the selector board assembly 126 to rotate upon.

The spindle 138 may include a fastener 152, which may be a knob or the like, which may be threadably engaged with the spindle 138, and which is shaped and sized to be manipulated by an operator to loosen and tighten the selector board assembly 126 in position relative to the fixed board 108. Tightening the fastener 152 has the effect of fixing the position of the selector board assembly 126 relative to the fixed board assembly 106. Also, tightening the fastener 152 causes electrical elements of the selector board assembly 126 to be biased into electrical connection against the contact pairs 1-13 as will be explained in detail below.

As noted above, the selector board assembly 126 is rotatably attached to the fixed board assembly 106 by way of the center axis 136. The selector board assembly 126 includes a selector board 150 rotatably disposed on center axis 136. The spindle 138 of center axis 136 permits the selector board 150 to rotate relative to the fixed board 108 and may permit rotation. Alternatively, when the fastener 152 is tightened selector board 150 is secured in position.

The selector board 150 may be constructed of the same material as the fixed board 108 or any suitable material. The selector board 150 includes a plurality of alignment openings 160 that correspond to the position of the alignment members 142 and are configured to receive the alignment elements 144. When the selector board 150 is desired to be secured in a selected configuration, the alignment members 142 are secured to the selector board. In one embodiment, a plurality of the alignment members 142 are arranged near the outer edges of the fixed board 108 and the selector board 150 to provide both alignment and clamping forces.

The plurality of alignment members 142 may be distributed over the area of the fixed board 108. For example, some of the alignment members 142 may be arranged at or near the outer edges of the fixed board 108 to provide support for the peripheral areas of the selector board 150 and some of the alignment members may be intermediately positioned between the outer edges of the fixed board and the center axis 136 in order to support the intermediate areas of the selector board.

The selector board 150 includes a plurality of jumpers A-N. The jumpers A-N are arranged on the selector board 150 to be in facing engagement with the contact pairs 1-13 of the fixed board 108. The jumpers A-N are sized and shaped, in each of the positions of the selector board, to electrically connect and bridge the appropriate sets of contact pairs 1-13 (upon which the generator leads are terminated) in order to match the desired voltage thus bridging the electrical connection between the contact pair(s). In the illustrated embodiment, the jumpers A-N are distributed across all four quadrants of the selector board.

In addition to jumpers A-N, the selector board 150 includes a first position jumper X1 and a second position jumper X2. The first position jumper X1 and second position jumper X2 may be aligned with and bridge one or both of the position contact pairs Y1 and Y2 to provide a signal to the controller 154 for the functions described above corresponding to the selected configuration.

Table 1 sets out the status of each of the contact pairs 1-13 and the position contact pairs Y1, Y2 in each of the possible predetermined configurations, Voltage A (first configuration), Voltage B (second configuration), and Voltage C (third configuration). In the table, a blank field indicates that the contact pair is not bridged. In the table, where a contact pair 1-13) or position contact pair Y1, Y2 is bridged the jumper A-N or position jumper X1, X2 responsible for bridging the relevant contact pair is indicated in the field.

TABLE 1

|  | Voltage A (Bridged Jumper) | Voltage B (Bridged Jumper) | Voltage C (Bridged Jumper) |
|---|---|---|---|
| Contact Pair 1 |  |  | (J) |
| Contact Pair 2 | (B) | (M) |  |
| Contact Pair 3 | (A) |  |  |
| Contact Pair 4 |  |  | (K) |
| Contact Pair 5 |  | (N) |  |
| Contact Pair 6 |  | (J) |  |
| Contact Pair 7 |  | (I) | (D) |
| Contact Pair 8 | (L) | (H) |  |
| Contact Pair 9 |  | (G) | (L) |
| Contact Pair 10 |  | (F) | (B) |
| Contact Pair 11 | (K) |  |  |
| Contact Pair 12 | (J) |  |  |
| Contact Pair 13 |  | (E) | (A) |
| Y1 | (X2) |  |  |
| Y2 |  | (X1) |  |

For example, the configuration for Voltage A, i.e., the first configuration, is selected by aligning a subset of the plurality of jumpers (jumpers B, A, L, K, and J) respectively to bridge a first subset of the plurality of contact pairs (contact pairs 2, 3, 8, 11, and 12). The first configuration thus constitutes a selected first grouping of the jumpers and contact pairs. Also position jumper X2 bridges position contact pair Y1 to indicate the configuration of the connection apparatus 102 to the controller 154. In one embodiment, the configuration for Voltage A generates an output of 120 volts.

In the configuration for Voltage B., i.e., the second configuration or second grouping, an output of 240 volts may be generated. In the configuration for Voltage C., i.e., the third configuration or third grouping, an output of 480 volts may be generated. The disclosure contemplates other possible outputs.

Various embodiments disclosed herein are to be taken in the illustrative and explanatory sense, and should in no way be construed as limiting of the present disclosure.

INDUSTRIAL APPLICABILITY

The connection apparatus 102 of the present disclosure is used to select one of a plurality of voltages of a mobile or non-mobile electrical generator. In use, the operator removes the fasteners 146 after ensuring that the generator is not generating electricity. The fastener 152 of the spindle 138 is loosened. The selector board assembly 126 is pulled away from the fixed board assembly 106 thus disconnecting all electrical connections of the contact pairs 1-13 and jumpers A-N. The selector board assembly 126 is rotated about the center axis 136 to a new configuration, in one embodiment by rotating the selector board assembly 90, 180 or 270 degrees to select a new configuration. The fastener 152 is tightened and the fasteners 146 are tightened to align and clamp the selector board assembly 126 to the fixed board assembly 106. Thus, a new combination of connection are made when a subgroup of contact pairs 1-13 and jumpers A-N are brought into contact and a new configuration is selected.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. An apparatus, comprising:
    an electrical generator including a plurality of windings; and
    a connection apparatus including a fixed board assembly and a selector board assembly;
    the fixed board assembly operatively connected to the electrical generator, the fixed board assembly including a fixed board including a center axis and a plurality of contact pairs attached to the fixed board, each of the plurality of windings in electrical continuity with at least one of the plurality of contact pairs;
    the selector board assembly rotatably mounted on the fixed board assembly, the selector board assembly including a selector board and a plurality of jumpers attached to the selector board, wherein at least one of the plurality of jumpers are shaped and arranged on the selector board to selectively electrically bridge at least one of the contact pairs to provide a first voltage output in a first configuration and a second voltage output in a second configuration, wherein the second configuration is produced by rotating the selector board assembly relative to the fixed board assembly about the center axis from the first configuration.

2. The apparatus of claim 1, including a plurality of alignment members connected to the fixed board and configured to support the selector board.

3. The apparatus of claim 2, wherein at least some of the plurality of alignment members are disposed at or near an edge of the fixed board.

4. The apparatus of claim 3, wherein all of the plurality of alignment members are disposed along the edge.

5. The apparatus of claim 2, wherein the plurality of alignment members each include a spacer disposed between the fixed board and the selector board and which is sized to enable contact between the plurality of contact pairs and the plurality of jumpers.

6. The apparatus of claim 1, wherein the center axis includes spindle and a fastener attached to the spindle that when loosened permits rotation of the selector board relative to the fixed board and when tightened secures the selector board in position.

7. The apparatus of claim 1, wherein each of the plurality of contact pairs are disposed on an upper surface of the fixed board and include a terminal part that extends through and below the fixed board.

8. The apparatus of claim 7, wherein each terminal part includes a terminal opening and a fixture that is configured to receive a wiring lug.

9. The apparatus of claim 7, wherein each of the plurality of jumpers are disposed on the selector board facing the upper surface of the fixed board.

10. The apparatus of claim 1, further comprising two position contact pairs disposed on the fixed board and two position jumpers disposed on the selector board, the two position jumpers shaped and arranged to selectively electrically bridge selected ones of the two position contact pairs to provide position information of the selector board relative to the fixed board.

11. The apparatus of claim 10, further comprising a controller that is configured to receive the position information and configure operational parameters of the generator based on the position information.

12. The apparatus of claim 11, wherein the position information corresponds to a selected voltage output.

13. The apparatus of claim 1, wherein the second configuration is produced by moving the selector board assembly one of 90 degrees, 180 degrees, and 270 degrees.

14. The apparatus of claim 1, comprising three configurations of the selector board assembly relative to the fixed board assembly, each one of the three configurations producing a different output voltage of the generator.

15. The apparatus of claim 14, wherein the three configurations respectively correspond to series star, parallel star, and single phase.

16. A connection apparatus, comprising:
    a fixed board assembly including a fixed board including a center axis and a plurality of contact pairs attached to the fixed board, each of a plurality of windings of an electrical generator in electrical continuity with at least one of the plurality of contact pairs; and
    a selector board assembly rotatably mounted on the fixed board assembly, the selector board assembly including a selector board and a plurality of jumpers attached to the selector board, wherein the plurality of jumpers are shaped and arranged on the selector board to selectively electrically bridge at least one of the contact pairs to provide a first voltage output in a first configuration and a second voltage output in a second configuration, wherein the second configuration is produced by rotating the selector board assembly relative to the fixed board assembly about the center axis from the first configuration.

17. The apparatus of claim 16, including a plurality of alignment members connected to the fixed board and configured to support the selector board.

18. A method of selecting an output voltage of a three phase generator with a connection apparatus, the connection apparatus comprising a fixed board assembly and a selector board assembly, the fixed board assembly operatively connected to the generator, the fixed board assembly including a fixed board including a center axis and a plurality of contact pairs attached to the fixed board, each of a plurality of windings of the generator in electrical continuity with at least one of the plurality of contact pairs, the selector board assembly rotatably mounted on the fixed board assembly, the selector board assembly including a selector board and a plurality of jumpers attached to the selector board, the method comprising:
    rotating the selector board assembly from a first angular position to a second angular position relative to the fixed board assembly;
    bridging, with a subset of the plurality of jumpers, a subset of the plurality of contact pairs to create a selected configuration corresponding to a selected output voltage; and
    securing the selector board to the fixed board in the selected position.

19. The method of claim 18, wherein the selected configuration is one of three alternative configurations.

20. The method of claim 18, wherein the selector board and the fixed board are fixed with a fastener disposed at the center axis and a plurality of alignment members.

* * * * *